United States Patent
Suzuki

(10) Patent No.: US 11,138,841 B2
(45) Date of Patent: Oct. 5, 2021

(54) READING APPARATUS AND A READING METHOD

(71) Applicant: TOSHIBA TEC KABUSHIKI KAISHA, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 16/691,054

(22) Filed: Nov. 21, 2019

(65) Prior Publication Data

US 2020/0226888 A1    Jul. 16, 2020

(30) Foreign Application Priority Data

Jan. 10, 2019    (JP) .............................. JP2019-002906

(51) Int. Cl.
*G07G 1/00*    (2006.01)
*G07G 1/12*    (2006.01)

(52) U.S. Cl.
CPC .......... *G07G 1/0054* (2013.01); *G07G 1/009* (2013.01); *G07G 1/0081* (2013.01); *G07G 1/12* (2013.01)

(58) Field of Classification Search
CPC ..... G07G 1/0045; G07G 1/0054; G07G 1/009
USPC ........................................ 235/383
See application file for complete search history.

(56) References Cited

U.S. PATENT DOCUMENTS

| 2010/0288837 | A1 | 11/2010 | Tomiyama et al. | |
| 2014/0061305 | A1* | 3/2014 | Nahill | G06K 7/1096 235/438 |
| 2014/0338987 | A1* | 11/2014 | Kobres | A47F 9/04 177/1 |
| 2019/0283909 | A1* | 9/2019 | Amemura | B65B 57/00 |
| 2020/0364692 | A1* | 11/2020 | Herbert | G06Q 20/3223 |

FOREIGN PATENT DOCUMENTS

| EP | 2867872 A1 | 5/2015 |
| EP | 3276742 A1 | 1/2018 |
| JP | 2013-73296 A | 4/2013 |

OTHER PUBLICATIONS

Extended European Search Report dated Mar. 17, 2020 mailed in counterpart European Application No. 19218602.1, 7 pages.

\* cited by examiner

*Primary Examiner* — Toan C Ly
(74) *Attorney, Agent, or Firm* — Kim & Stewart LLP

(57) ABSTRACT

A reading apparatus for reading a wireless tag attached to a commodity includes a wireless tag reader configured to emit a radio wave and read information in a radio wave returned from a wireless tag, and a processor configured to control the wireless tag reader to emit the radio wave, upon detection of radio waves returned from one or more wireless tags, determine one or more commodity codes based on information contained in the radio waves, and upon detection of at least one commodity placed in a predetermined area, register the one or more commodity codes determined within a predetermined time prior to the placement of said at least one commodity in the predetermined area.

20 Claims, 4 Drawing Sheets

READING APPARATUS AND A READING METHOD

CROSS-REFERENCE TO RELATED APPLICATION

This application is based upon and claims the benefit of priority from Japanese Patent Application No. 2019-002906, filed Jan. 10, 2019, the entire contents of which are incorporated herein by reference.

FIELD

Embodiments of the present invention relate to a reading apparatus and a reading method.

BACKGROUND

Conventionally, a reading apparatus has been used for registering a commodity to be sold by reading information from a radio tag attached thereto. In such a reading apparatus, a dedicated area in which a shopping basket containing one or more commodities is placed, is set.

In response to an operation to start reading by an operator, the reading apparatus reads the wireless tag attached to each commodity in the shopping basket placed in the dedicated area, and executes the commodity registration processing.

However, the wireless tags attached to the commodities in the shopping basket do not necessarily face the tag reader. Therefore, radio waves may be blocked by the commodity itself or other commodities, and as a result, the registration may not be completed correctly due to the communication error.

DETAILED DESCRIPTION

According to one embodiment, a reading apparatus for reading a wireless tag attached to a commodity includes a wireless tag reader configured to emit a radio wave and read information in a radio wave returned from a wireless tag, and a processor configured to control the wireless tag reader to emit the radio wave, upon detection of radio waves returned from one or more wireless tags, determine one or more commodity codes based on information contained in the radio waves, and upon detection of at least one commodity placed in a predetermined area, register the one or more commodity codes determined within a predetermined time prior to the placement of said at least one commodity in the predetermined area.

Embodiments of the reading apparatus will be described in detail below with reference to the accompanying drawings. Note that the embodiments described below are not intended to limit the configuration and specification of the reading apparatus. The reading apparatus according to one embodiment is a POS (Point Of Sales) terminal installed in a store.

Figure 1:
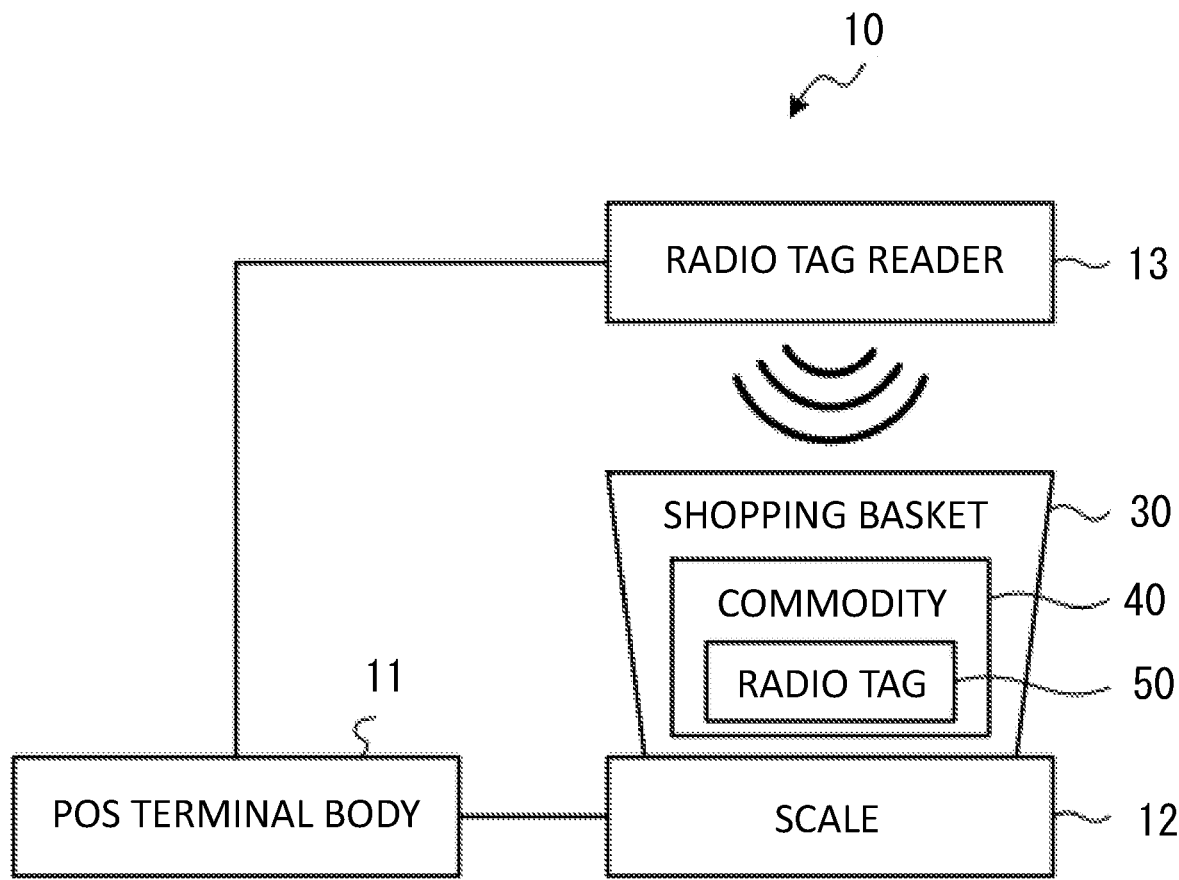
FIG. 1 is a diagram illustrating a POS terminal according to an embodiment of the present invention.

FIG. 1 is a diagram illustrating the POS terminal 10 according to the embodiment. The POS terminal 10 includes a POS terminal body 11, a scale 12, and a radio tag reader 13. The scale 12 and the radio tag reader 13 are electrically connected to the POS terminal body 11.

The POS terminal body 11 executes a commodity registration processing for registering a commodity 40 to be sold, and a checkout processing for the commodity 40 registered in the commodity registration processing by the POS terminal body 11. The POS terminal body 11 controls the scale 12 and the radio tag reader 13.

The scale 12 detects that the commodity 40 has been placed in a predetermined position based on weight. For example, the scale 12 weighs the shopping basket 30 placed at the predetermined position. The shopping basket 30 contains one or more commodities 40 to be sold, which are picked up by a customer. Therefore, the scale 12 detects that the commodities 40 have been placed in the shopping basket 30 on the basis of the weight of the commodities 40 placed in the shopping basket 30. Alternatively, when the commodities 40 are placed at the predetermined position, the scale 12 detects that the commodities 40 have been placed at the predetermined position on the basis of the weight of the commodities 40. A predetermined weight to detect the shopping basket 30 or at least one certain commodity may be stored in a storage unit 102 of the POS terminal 10 in advance.

The radio tag 50 is attached to each commodity 40. The radio tag 50 is a tag such as an RF (Radio Frequency) tag. The radio tag 50 includes an IC (Integrated Circuit) chip for storing information and an antenna. The radio tag 50 reads information stored in the IC chip and also writes information into the IC chip, by communicating with the radio tag reader 13. When the radio tag 50 receives a radio wave emitted from the radio tag reader 13, the radio tag 50 reads information stored in the ID chip and emits a radio wave containing the information to the radio tag reader 13. For example, commodity information relating to the commodity 40 is stored in the radio tag 50 attached thereto. The commodity information includes, for example, a commodity code to identify the commodity 40.

The radio tag reader 13 reads the commodity information stored in the radio tag 50 in a reading area by a wireless communication with the radio tag 50. Here, the radio tag reader 13 is arranged to face toward the scale 12 so that the predetermined position of the scale 12 is included in the reading area. Accordingly, the radio tag reader 13 reads the radio tag 50 attached to each commodity 40 placed at the predetermined position of the scale 12 in the reading area.

The radio tag reader 13 emits radio waves toward not only the predetermined position of the scale 12 but also the periphery of the predetermined position. Therefore, the reading area of the radio tag reader 13 includes the predetermined position of the scale 12 and the periphery thereof. The reading area may cover an area around the POS terminal 10 and a path along which a customer travels toward the POS terminal 10. Therefore, the radio tag reader 13 can read the radio tag 50 attached to each commodity 40 carried in the shopping basket 30 or held by the customer traveling toward the POS terminal 10.

The radio tag reader 13 shown in FIG. 1 emits the radio waves from the upper side of the scale 12 toward the scale 12. However, the radio tag reader 13 may emit the radio waves toward the scale 12 from any direction, not limited to the upper side. That is, the radio tag reader 13 may emit the radio waves from the lower side of the scale 12 upward, or may emit the radio waves from the left or right side of the scale 12. Furthermore, the radio tag reader 13 may emit the radio waves from a plurality of directions. Further, the scale 12 and the radio tag reader 13 may be part of the POS terminal 10.

Figure 2:
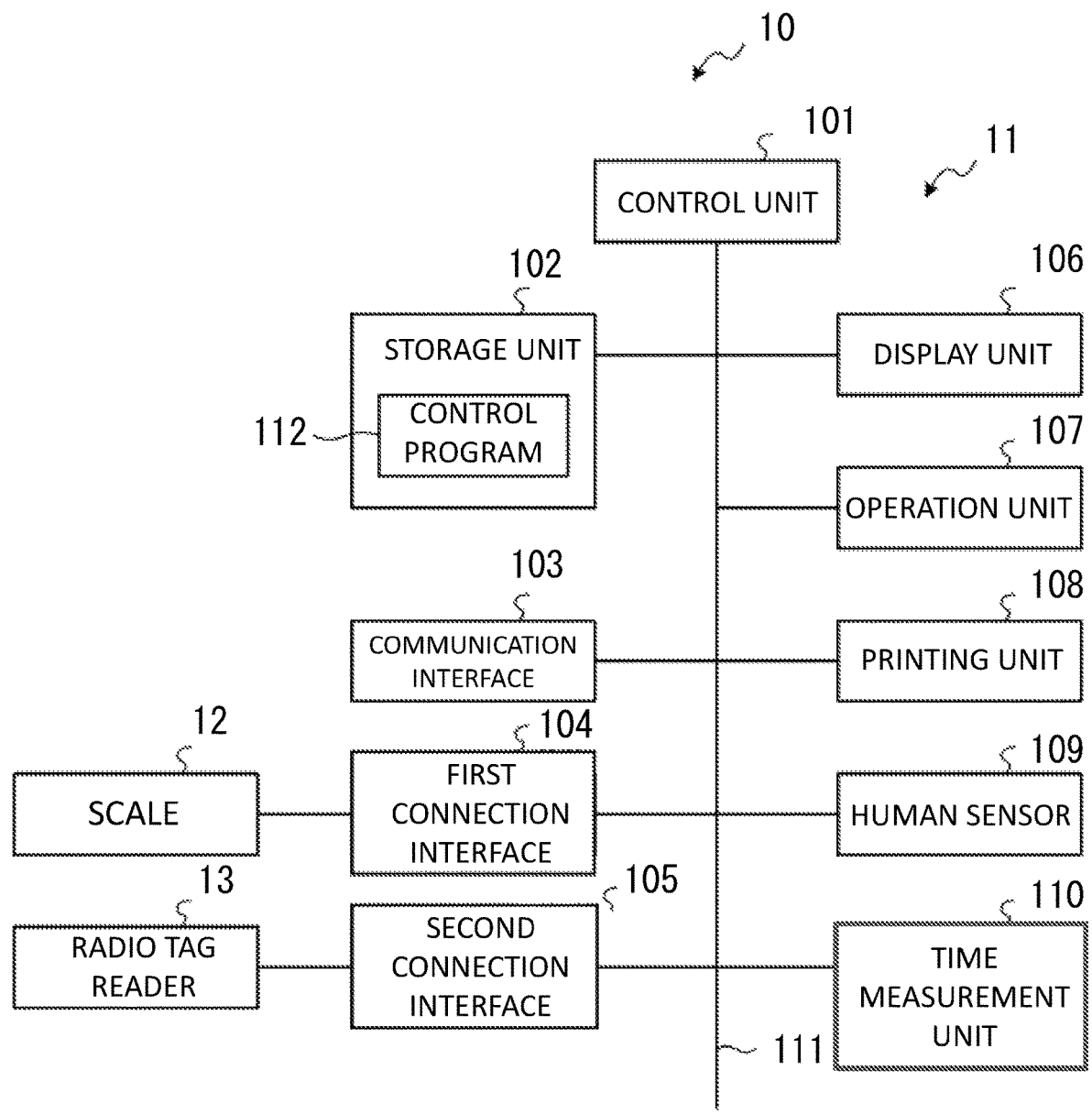
FIG. 2 is a block diagram illustrating a hardware configuration of the POS terminal.

FIG. 2 is a block diagram illustrating a hardware configuration of the POS terminal 10. The POS terminal 10 includes a control unit 101, a storage unit 102, a communication interface 103, a first connection interface 104, a second connection interface 105, a display unit 106, an operation unit 107, a printing unit 108, a human sensor 109, and a time measurement unit 110. These components are connected to each other via a system bus 111 such as a data bus or an address bus.

The control unit 101 is a computer that controls the overall operation of the POS terminal 10 and performs the various functions of the POS terminal 10. The control unit 101 includes a CPU (Central Processing Unit) or a processor, a ROM (Read Only Memory), and a RAM (Random Access Memory). The CPU controls the operation of the POS terminal 10 in a centralized manner. The ROM is a nonvolatile memory that stores various data even when power is not supplied thereto. The RAM provides a working memory for the CPU into which a program stored in the ROM or the storage unit 102 is loaded and from which the CPU executes the program.

The storage unit 102 is a storage device such as a hard disk drive (HDD) or a solid state drive (SSD). The storage unit 102 stores the control program 112 and various kinds of information. The control program 112 is a program for performing the functions provided by the operating system and the POS terminal 10 according to the embodiments.

The communication interface 103 is a communication interface circuit that performs communication with an external device connected via a network.

The first connection interface 104 is an interface circuit for connecting to a peripheral device such as a USB (Universal Serial Bus) device. The first connection interface 104 is connected to the scale 12.

The second connection interface 105 is another interface circuit for connecting to a peripheral device such as a USB device. The second connection interface 105 is connected to the radio tag reader 13.

The display unit 106 includes a touch panel display comprising a plurality of panels are stacked on its surface. The operation unit 107 is an input device such as a keyboard for operating the POS terminal 10.

The printing unit 108 is a printer that issues a receipt on which various pieces of information related to one transaction are printed.

The human sensor 109 detects a person who has entered into the reading area where the radio tag reader 13 emits the radio waves to read the radio tag 50. There is no limitation on the method of detecting the person by the human sensor 109. That is, the human sensor 109 may detect a person by infrared rays, by weight, or by any other known method.

The time measurement unit 110 measures time. For example, the time measurement unit 110 is a timer.

Figure 3:
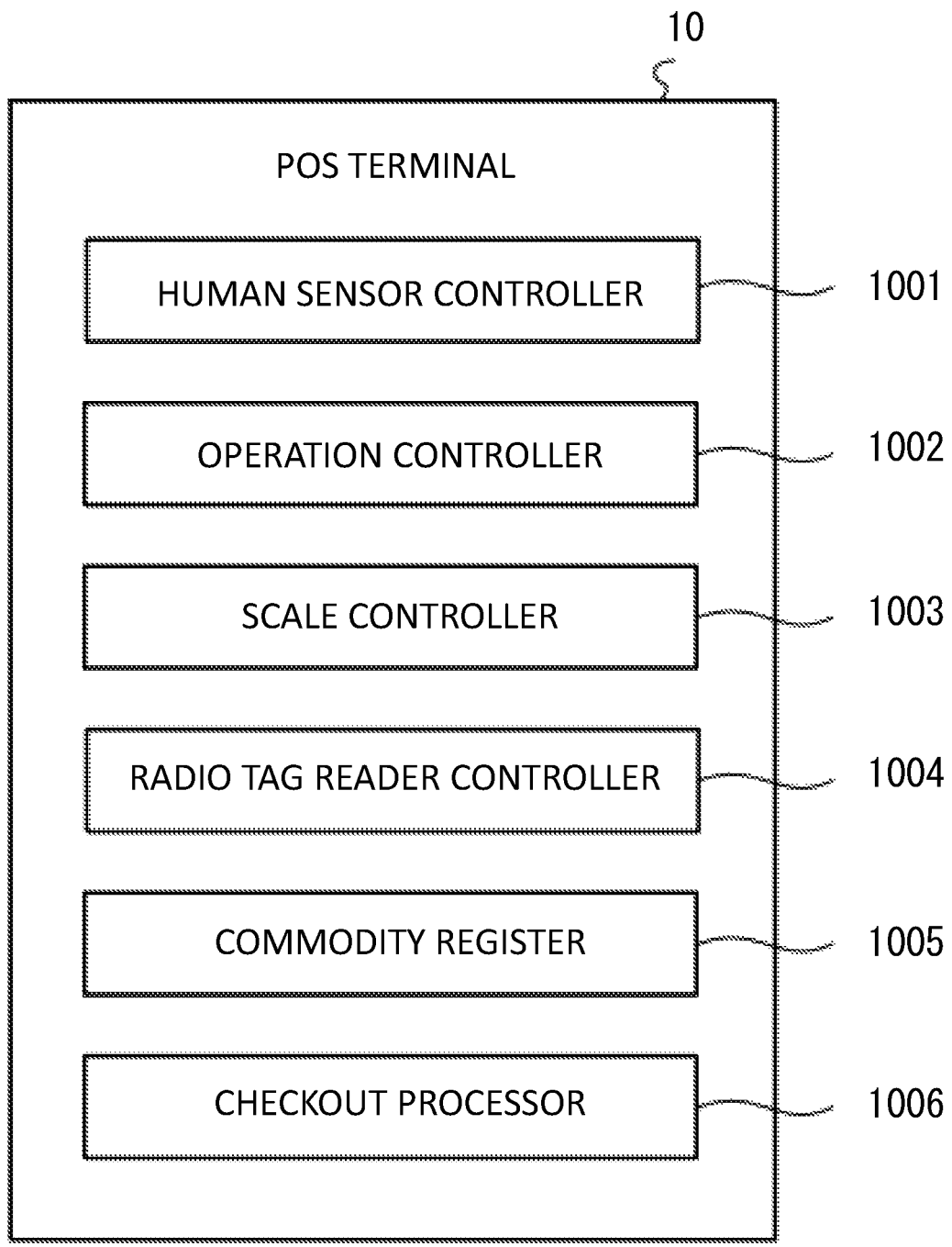
FIG. 3 is a block diagram illustrating a characteristic functional configuration of the POS terminal.

Next, characteristic functions of the POS terminal 10 will be described. FIG. 3 is a block diagram illustrating a functional configuration of the POS terminal 10.

The control unit 101 of the POS terminal 10 loads the control program 112 stored in the storage unit 102 into the RAM, and executes the control program 112, thereby functioning as the functional units shown in FIG. 3. Specifically, the control unit 101 of the POS terminal 10 functions as a human sensor controller 1001, an operation controller 1002, a scale controller 1003, a radio tag reader controller 1004, a commodity register 1005, and an checkout processor 1006.

The human sensor controller 1001 is a controller for the human sensor 109 which detects a person who has entered into the reading area where the radio tag reader controller 1004 reads the radio tag 50.

The operation controller 1002 is a controller for the operation unit 107 and the touch panel of the display unit 106 which receive various inputs. For example, the operation controller 1002 recognizes an input of the commodity registration operation for registering the commodity 40 to be sold by reading the radio tag 50 by the radio tag reader controller 1004.

The scale controller 1003 is connected to the scale via the second connection interface 105. More specifically, the scale controller 1003 detects that the commodity 40 is placed at the reading position based on the weight by the scale 12.

The radio tag reader controller 1004 is connected to the radio tag reader 13 via the first connection interface 104. For example, the radio tag reader controller 1004 controls the radio tag reader 13 to read commodity information from the radio tag 50 attached to the commodity 40 in the read area. As a result, the radio tag reader controller 1004 receives the commodity code read from the radio tag 50 attached to the commodity 40.

When the human sensor controller 1001 detects a person, the radio tag reader controller 1004 starts processing for reading commodity information from the radio tag 50, i.e., the radio tag reader controller 1004 starts to emit the radio waves for reading the commodity information from the radio tag 50. As described above, the radio tag reader controller 1004 starts the reading process when the human sensor controller 1001 detects a person, thereby limiting the time during which the radio wave to read the radio tag 50 is emitted. By contrast, when the POS terminal 10 always emits the radio waves to read the radio tag 50, the POS terminal 10 does not need to have the human sensor 109.

The commodity register 1005 registers the commodity identified by the commodity code included in the commodity information read by the radio tag reader controller 1004 as the commodity 40 to be sold. More specifically, before the scale controller 1003 detects the placement of the commodity 40 by detecting weight on the scale 12, the commodity register 1005 temporarily registers the commodity 40 identified by the commodity code read by the radio tag reader controller 1004. Then, when the scale controller 1003 detects the placement of the commodity 40, the commodity register 1005 determines one or more commodities 40 which have been temporarily registered within a predetermined time before the scale controller 1003 detected weight on the scale 12. The predetermined time is set in advance to exclude commodities unrelated to the transaction from being temporarily registered incorrectly. Then, the commodity register 1005 registers the determined commodities 40 as the commodities 40 to be sold. Here, the predetermined time may be, for example, three seconds. Any length of time can be set for the predetermined time.

Furthermore, when the radio tag reader controller 1004 reads the commodity code after the scale controller 1003 detects the placement of the commodity 40, the commodity register 1005 registers the commodity 40 identified by the read commodity code as the commodity 40 to be sold. That is, the commodity register 1005 registers the commodity 40 as the commodity to be sold without undergoing temporary registration. In this manner, the commodity register 1005 registers the commodity 40 identified by the commodity code read by the radio tag reader controller 1004 during the predetermined time and the commodity code read by the radio tag reader controller 1004 after the detection of the placement of the commodity 40.

The checkout processor 1006 executes the checkout process of the registered commodity 40. For example, the checkout processor 1006 calculates the total amount of the commodity 40 registered by the commodity registration. The checkout processor 1006 calculates the amount of change to the amount of money received from the customer.

Figure 4:
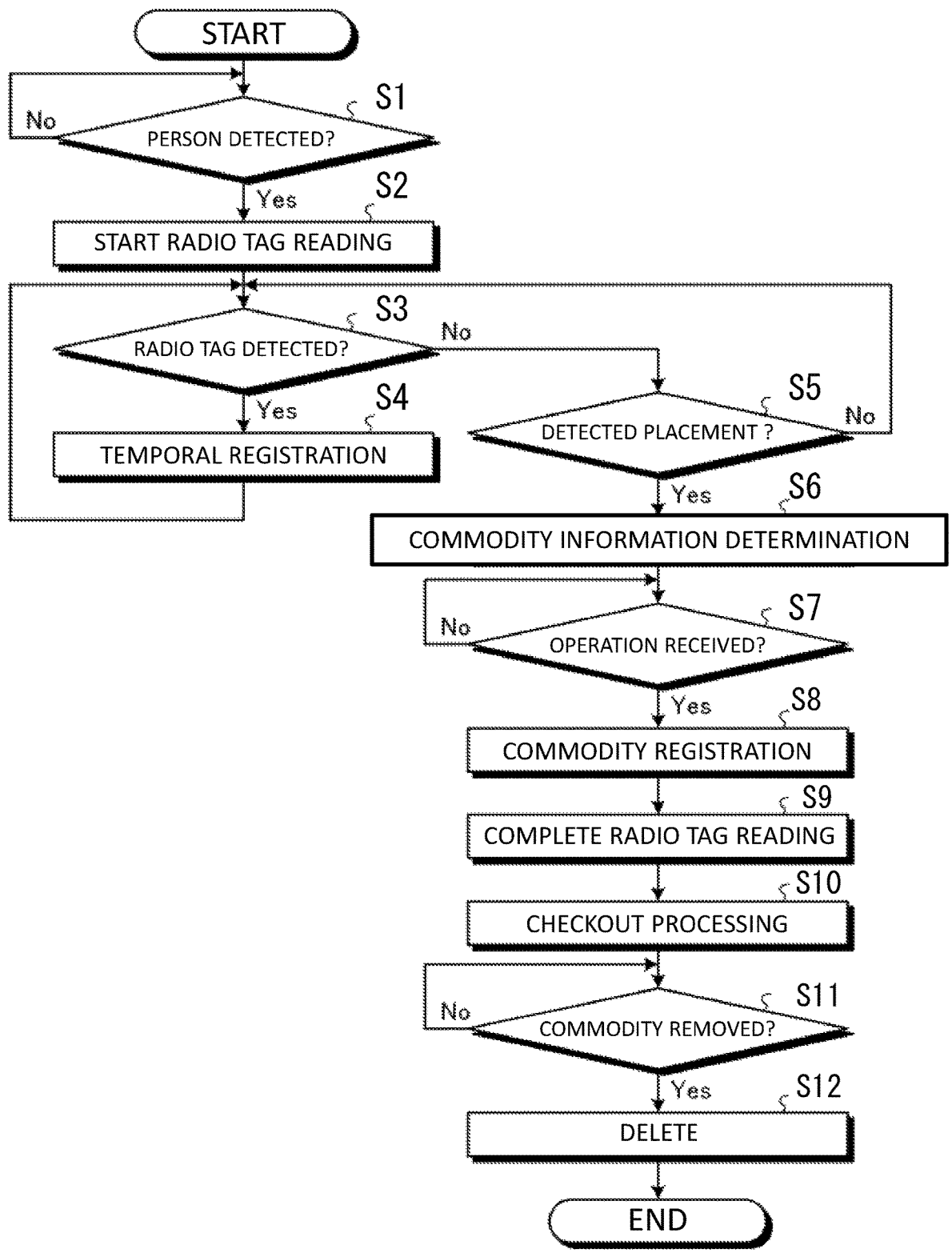
FIG. 4 is a flowchart of sales data registration processing executed by the POS terminal.

Next, a sales data registration process executed by the POS terminal 10 will be described. The sales data registration process includes the commodity registration process for registering the commodity 40 to be sold, and the checkout process for the commodity 40 registered by the commodity registration process. Here, FIG. 4 is a flowchart illustrating the sales data registration process executed by the POS terminal 10.

The human sensor controller 1001 determines whether or not a person has been detected (step S1). That is, the human sensor controller 1001 determines whether or not a customer heading toward the POS terminal 10 has been detected by the human sensor 109. On condition that no person is detected (step S1, No), the POS terminal 10 remains in a standby state.

On condition that a person has been detected (step S1, Yes), the radio tag reader controller 1004 starts reading the radio tag 50 (step S2). That is, the radio tag reader controller 1004 controls the radio tag reader 13 to emit radio waves to read the radio tag 50.

The radio tag reader controller 1004 determines whether or not the radio tag 50 is detected (step S3). That is, the radio tag reader controller 1004 determines whether or not the commodity information is received from the radio tag 50.

On condition that the radio tag 50 is detected (step S3, Yes), the commodity register 1005 temporarily registers the commodity 40 of the commodity code included in the commodity information read from the radio tag 50 (step S4). Then, the POS terminal 10 proceeds to step S3 to continue reading of the radio tag 50.

On condition that there are not any other radio tags 50 that have not been detected (step S3, No), the scale controller 1003 determines whether or not the commodity 40 is placed on the reading position (step S5). On condition that the placement of the commodity 40 is not detected (step S5, No), the POS terminal 10 proceeds to step S3 and continues reading of the radio tag 50.

On condition that the placement of the commodity 40 is detected (step S5, Yes), the commodity register 1005 determines commodity information of the temporarily registered commodities read by the radio tag reader controller 1004 within a predetermined time before the scale controller 1003 detects the placement of the commodity 40 (step S6). For example, the determined commodity information is registered in the RAM of the control unit 101. The POS terminal 10 continues reading the radio tag 50 even after the scale controller 1003 detects the placement of the commodity 40.

The operation controller 1002 determines whether or not an operation for starting the commodity registration has been received (step S7). On condition that the operation for instructing the execution of the commodity registration is not received (step S7, No), the POS terminal 10 waits for the commodity registration.

On condition that the operation for instructing the execution of the commodity registration is received (step S7, Yes), the commodity register 1005 registers each commodity 40 identified by the commodity code included in the commodity information read by the radio tag reader controller 1004 (step S8). That is, the commodity register 1005 registers the commodity information read by the radio tag reader controller 1004 within the predetermined time before the commodity 40 is placed, and the commodity information read by the radio tag reader controller 1004 after the commodity 40 is placed on the reading position.

The radio tag reader controller 1004 ends the reading of the radio tag 50 in step S9. That is, the radio tag reader controller 1004 stops emitting the radio waves to read the radio tag 50.

The checkout processor 1006 executes the checkout process of the commodity 40 registered in the commodity register (step S10).

The scale controller 1003 determines whether or not the commodity 40 placed in the placement position has been removed (step S11). On condition that the commodity 40 is not removed (step S11; No), the POS terminal 10 remains in the standby state.

On condition that the commodity 40 has been removed (step S11, Yes), the commodity register 1005 deletes the temporarily registered commodity information (step S12).

As described above, the POS terminal 10 ends the sales data registration process in the above manner.

As described above, the POS terminal 10 according to the present embodiment reads commodity information from the radio tag 50 located in the peripheral region including the reading position. That is, the POS terminal 10 reads commodity information from the radio tag 50 attached to each commodity 40 being carried by the customer before the commodity 40 is placed at the reading position. When the commodity 40 is placed at the reading position, the POS terminal 10 extracts the commodity information within the predetermined time before the commodity 40 is placed at the reading position. Then, the POS terminal 10 registers the commodity 40 identified by the commodity code included in the extracted commodity information. Thus, the POS terminal 10 reads the commodity information from the radio tag 50 attached to the commodity 40 being carried by a customer, as well as the ones placed in the reading position. Therefore, the POS terminal 10 according to the present embodiment can increase the possibilities to read the radio tags 50 that cannot be read under the condition that the commodity 40 is placed at the reading position.

In the above embodiment, the POS terminal 10 has been described as detecting that the shopping basket 30 or the commodity 40 is placed at the reading position based on the weight of the scale 12. However, the POS terminal 10 may detect that the commodity 40 is placed by other methods. For example, the POS terminal 10 may detect the commodity 40 by an infrared sensor, a mechanical switch, or the like.

The program executed in each of the apparatuses of the above embodiments and modifications is provided by being incorporated in advance in a storage medium (ROM or storage unit) included in each apparatus, but is not limited thereto. For example, it may be configured to be recorded on a computer-readable recording medium such as a CD-ROM, a flexible disk (FD), a CD-R, a DVD (Digital Versatile Disk), or the like, in an installable format or a file in an executable format. Further, the storage medium is not limited to a computer or a medium independent of an embedded system, but also includes a storage medium which is stored or temporarily stored by downloading a program transmitted by a LAN, the Internet, or the like.

Further, the program executed in each of the above embodiments and the modified example may be stored on a computer connected to a network such as the Internet, downloaded or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reading apparatus for reading a wireless tag attached to a commodity, the reading apparatus comprising:
   a wireless tag reader configured to emit a radio wave and read information in a radio wave returned from a wireless tag; and
   a processor configured to:
      control the wireless tag reader to emit the radio wave; and
      upon detecting that one or more commodities are placed in a predetermined area, determine and register for purchase one or more commodity codes based on:
         information contained in first radio waves received by the wireless tag reader at a time when said one or more commodities are placed in the predetermined area; and
         information contained in second radio waves received by the wireless tag reader no more than a predetermined time before said one or more commodities are placed in the predetermined area.

2. The reading apparatus according to claim 1, wherein the processor is further configured to execute a checkout process based on the registered commodity codes.

3. The reading apparatus according to claim 1, further comprising:
   a sensor configured to detect a presence of a person, wherein
   the processor controls the wireless tag reader to emit the radio wave upon detection of the presence of the person by the sensor.

4. The reading apparatus according to claim 1, further comprising:
   a scale configured to detect a predetermined weight, wherein
   the processor determines that said one or more commodities are placed in the predetermined area upon detection of the predetermined weight by the scale.

5. The reading apparatus according to claim 4, further comprising:
   a memory that stores the predetermined weight.

6. The reading apparatus according to claim 1, wherein the radio wave is emitted to a predetermined range that covers the predetermined area and a peripheral area thereof.

7. The reading apparatus according to claim 6, wherein the peripheral area includes a passageway for a customer.

8. The reading apparatus according to claim 1, further comprising:
   a memory, wherein
   the processor stores the determined commodity codes in the memory.

9. The reading apparatus according to claim 8, wherein after checkout of commodities corresponding to the registered commodity codes, upon detecting that one of the commodities has been removed from the predetermined area, the processor deletes the corresponding commodity code from the memory.

10. The reading apparatus according to claim 1, wherein the predetermined area is an area on which a backset including one or more commodities to be purchased is placed.

11. A method for reading a wireless tag attached to a commodity, the method comprising:
    emitting a radio wave from a wireless tag reader; and
    upon detecting that one or more commodities are placed in a predetermined area, determining and registering for purchase one or more commodity codes based on:
       information contained in first radio waves received by the wireless tag reader at a time when said one or more commodities are placed in the predetermined area; and
       information contained in second radio waves received by the wireless tag reader no more than a predetermined time before said one or more commodities are placed in the predetermined area.

12. The method according to claim 11, further comprising:
    executing a checkout process based on the registered commodity codes.

13. The method according to claim 11, further comprising:
    detecting a presence of a person, wherein
    the radio wave is emitted upon detection of the presence of the person.

14. The method according to claim 11, further comprising:
    detecting a predetermined weight, wherein
    said one or more commodities are determined to be placed in the predetermined area upon detection of the predetermined weight.

15. The method according to claim 14, wherein the predetermined weight is stored in a memory.

16. The method according to claim 11, wherein the radio wave is emitted to a predetermined range that covers the predetermined area and a peripheral area thereof.

17. The method according to claim 16, wherein the peripheral area includes a passageway for a customer.

18. The method according to claim 11, further comprising:
    storing the determined commodity codes in a memory.

19. The method according to claim 18, further comprising:
    after checkout of commodities corresponding to the registered commodity codes, upon detecting that one of the commodities has been removed from the predetermined area, deleting the corresponding commodity code from the memory.

20. The method according to claim 11, wherein the predetermined area is an area on which a backset including one or more commodities to be purchased is placed.

* * * * *